July 28, 1959

G. PETERSON, JR 2,897,344

INSTRUMENT PANEL ILLUMINATOR

Filed May 2, 1957

INVENTOR:
GEORGE PETERSON JR.
BY Howson & Howson
ATTYS.

United States Patent Office 2,897,344
Patented July 28, 1959

2,897,344
INSTRUMENT PANEL ILLUMINATOR

George Peterson, Jr., Wayne, Pa., assignor to Penn Keystone Corporation, Conshohocken, Pa., a corporation of Pennsylvania Application May 2, 1957, Serial No. 656,537

6 Claims. (Cl. 240—8.16)

The present invention relates to new and useful improvements in instrument panel illuminators and the like and more particularly to new and useful improvements in an instrument panel illuminator wherein the source of illumination for the instrument dial is positioned behind the instrument panel and direct rays of light from the source of illumination are prevented from passing directly through the sight opening in the instrument panel.

The present invention is particularly suited for illuminating dials in an aircraft instrument panel or the like where a series of indicators are provided in the panel and it is necessary to illuminate the indicator without permitting direct rays of light to pass through the panel sight opening. This is accomplished according to the present invention by providing a separate source of illumination in each instrument and by arranging louvers intermediate the source of illumination and the dial so that the rays of light will either strike the dial directly or be reflected from the louvers to the dial, the louvers being so positioned to prevent the rays of light from directly striking the sight opening in the instrument panel for the dial.

With the foregoing in mind the principal object of the present invention is to provide a novel instrument panel illuminator or the like wherein the direct rays of light from the instrument panel illuminator are prevented from passing directly through the sight opening in the instrument panel.

Another object of the present invention is to provide a novel instrument panel illuminator having the above features which is of relatively small size and may be positioned within a relatively small instrument case.

A still further object of the present invention is to provide a novel instrument panel illuminator or the like having the features and characteristics set forth above which is of relatively simplified construction, may be manufactured easily and cheaply, and is entirely efficient and effective in operation and use.

These and other objects of the present invention and the various features and details of the operation and construction thereof are hereinafter more fully set forth and described with reference to the accompanying drawings in which.

Figure 1:
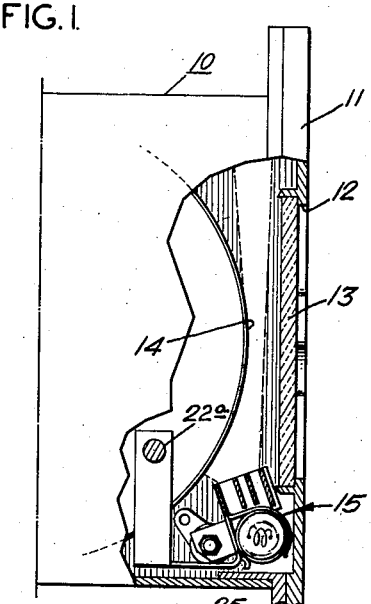
Fig. 1 is a side elevational view partially in section of a conventional dial type indicator positioned within an enclosed casing incorporating the instrument illuminator of the present invention.
Figure 2:
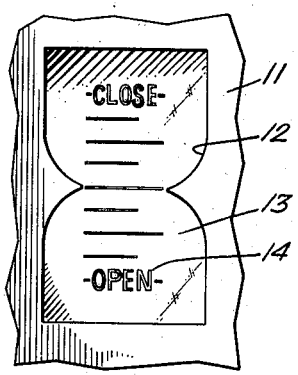
Fig. 2 is a fragmentary front view of the instrument of Fig. 1 illustrating the illuminated zone on the indicating dial.

Referring more specifically to the drawings and particularly Figs. 1 and 2 thereof reference numeral 10 designates generally an enclosed casing for a conventional indicating instrument having a front wall 11 provided with a sight opening 12 which may or may not be covered with a sheet of glass or other transparent material 13 and through which the user of the instrument may view a conventional movable indicating dial 14. In the present instance the indicating dial 14 is illustrated as a rotatable cylindrical type dial having markings thereon to indicate the position of a member but it will be readily apparent that the present invention may also be used with any other conventional instrument dial such as an instrument having a stationary dial with a movable marker or indicator.

Mounted adjacent the forward bottom corner of the casing 10 and within the casing is the instrument panel illuminator of the present invention, designated generally as 15. This instrument panel illuminator is secured for example to the side wall of the casing 10 and is supported within the casing. The instrument panel illuminator comprises an integral bracket member 16 of generally U-shaped configuration having a main body portion 17 which extends transversely of the instrument casing 10 or at least the full width of the dial 14 and a pair of forwardly projecting side wall portions 18, 18 which extend forwardly and angularly upward toward the lower end of the sight opening when the instrument panel illuminator is mounted within the casing. The bracket 16 is mounted on the side wall of the casing 10 by means of a supporting arm 19 formed integrally with the bracket 16 and projecting downwardly below the main body portion 17 in the same plane as the body portion 17 and then rearwardly parallel to the bottom wall of the casing and terminating in an integral lug member 21 extending upwardly from the outer end of the arm 19 parallel to the side wall of the casing 10. An opening 22 is provided in the upper end of the lug 21 through which a bolt, rivet, or other fastening member 22a may be passed to secure the bracket 16 to the casing 10. The entire bracket 16 is formed as an integral piece out of thin sheet steel or sheet aluminum or the like and may be stamped in one operation from a sheet of material and thereafter bent into the desired shape.

The two opposite side walls 18, 18 of the bracket 16 each have a series of slots 23 formed therein extending downwardly into the side walls from the upper edge thereof substantially parallel to the main body portion 17 of the bracket 16. In the illustrated embodiment of the present invention there are three slots formed in each side wall with the two slots closest to the main body portion 17 of the bracket being of uniform depth while the outer slot in each side wall member is slightly longer than the first two slots. It will be understood, however, that any desired number of slots may be provided in these side wall members. The two inner slots and the elongated outer slot in the opposite side walls of the bracket are adapted to receive therein louvers 24 which extend the full length of the bracket 16 substantially parallel to each other and to the body portion of the bracket and terminate in rearwardly bent ears 25, 25 lying outwardly adjacent the outer surfaces of the side walls 18, 18 to prevent longitudinal movement of the louvers 24 relative to the bracket 16 and maintain the louvers in the desired position in the bracket 16.

Figure 3:
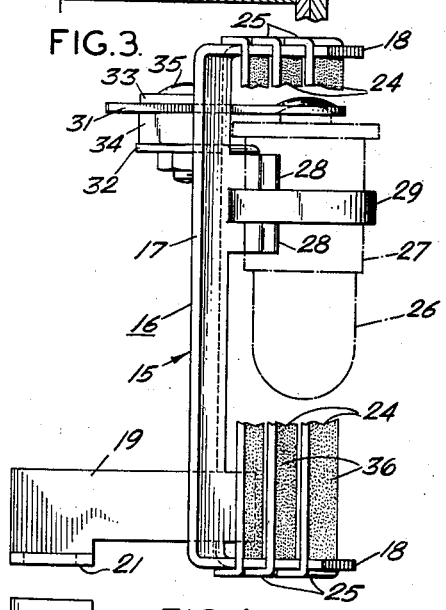
Fig. 3 is an enlarged plan view of the instrument panel illuminator of the present invention.
Figure 5:
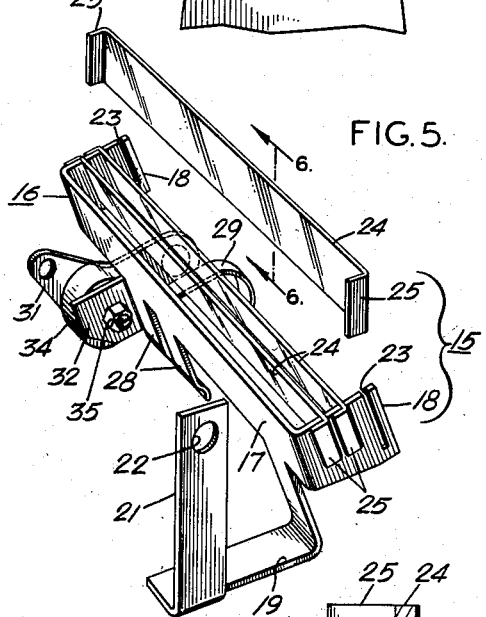
Fig. 5 is an exploded perspective view illustrating the construction of the illuminator of the present invention.
Figure 4:
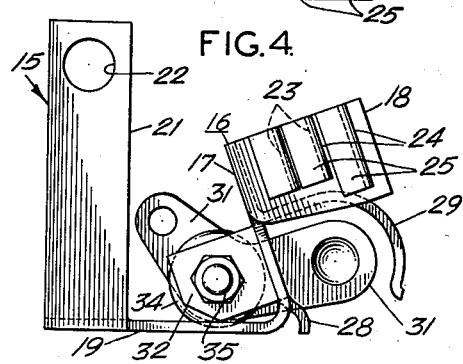
Fig. 4 is a side elevational view of the instrument panel illuminator of Fig. 3.

The bracket 16 is also designed to support a source of illumination such as a conventional electrical lamp 26 mounted in a conventional lamp socket 27 carried by the bracket 16. A lamp socket 27 is supported between two arms 28, 28 projecting downwardly from the body portion 17 of the bracket and a third arm or spring clip 29 projecting outwardly from the body portion 17 and then bent downwardly in spaced relation to the pair of arms 28, 28. These arms 28 and 29 are formed integral with the body portion of the bracket and provide a spring clip which supports the lamp socket 27. Electric power is supplied to the lamp 26 by means of a terminal contact 31 carried by a lug 32 formed integrally with the bracket 16 and projecting rearwardly of the main body portion 17 of the bracket. The terminal contact 31 is positioned between a pair of insulating washers 33 and 34 and then secured to the lug 32 for example by means of a bolt 35 as illustrated in Figs. 3 and 5. This terminal contact 31 projects forwardly of the bracket 16 beneath the bracket and engages the center contact of the lamp socket 27.

Figure 6:
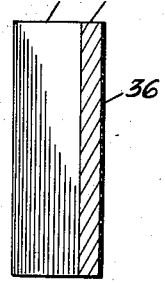
Fig. 6 is a greatly enlarged transverse sectional view through one louver taken on line 6—6, Fig. 5.

The instrument panel illuminator 15 described above is mounted within the casing 10 of the instrument to be illuminated as illustrated in Fig. 1 of the drawings with the lamp or light source adjacent the lower forward corner of the casing and the louvers 24 positioned intermediate the light source and the dial or portion of the instrument to be illuminated. The louvers are positioned at an angle relative to the plane of the sight opening so that the louvers lie in parallel planes which diverge inwardly away from the plane of the sight in a direction from the lower end of the sight opening toward the center of the sight opening and are so positioned to prevent direct light rays from passing from the lamp 26 through the sight opening 12. The surface of the louvers 24 away from the sight opening are polished to reflect light so that the light rays which strike these surfaces are reflected toward the face of the dial 14. Alternatively, the outer surfaces of the louvers 24 which face toward the sight opening 12 and the surface of the main body portion 17 of the bracket 16 which faces toward the sight opening 12 are painted in a dull black paint or otherwise coated with a non-reflecting material as indicated at 36 in Fig. 6 to prevent the light rays from being reflected off of the surfaces through the sight opening 12. By this construction, none of the light rays from the lamp 26 will pass directly through the sight opening 12 or will be reflected from one of the surfaces of the louvers 24 or bracket 16 through the sight opening 12 and that portion of the area within the casing 10 which is shaded in Fig. 1 will not be illuminated. Thus, solely the central and lower portion of the dial 14 will be illuminated. If desired, a second instrument panel illuminator (not shown) may be mounted within the casing 10 at the forward upper corner thereof to increase the illumination on the dial 14. Generally, however, this will not be necessary and one illuminator at one corner of the casing 10 will be sufficient to provide the desired illumination on the dial 14.

From the foregoing it will be apparent that the present invention provides a novel instrument panel illuminator which is extremely compact and may fit within a very small space in an instrument to illuminate the dial of the instrument without directing any light rays outwardly through the sight opening of the instrument. In addition, it will be apparent that the present invention provides a novel instrument panel illuminator which is of relatively inexpensive construction and may be easily stamped out of sheet metal and assembled to provide an illuminator which is highly efficient and effective in operation and use.

While a particular embodiment of the present invention has been illustrated and described herein it is not intended to limit the invention to such a disclosure and changes and modifications may be incorporated and embodied therein within the scope of the following claims.

I claim:

1. An instrument panel illuminator for an instrument having a casing, a sight opening in one wall of the casing and a dial within the casing adjacent the sight opening, comprising: a bracket member mounted within said casing outwardly adjacent the peripheral edge of said sight opening, said bracket comprising a body portion extending transversely of the casing and side wall portions on said body portion projecting therefrom toward the edge of the sight opening, a light source within said casing carried by said bracket body portion positioned outwardly adjacent the peripheral edge of said sight opening, and a plurality of spaced parallel louvers carried by said bracket wall portions and positioned intermediate said light source and said sight opening, said louvers extending angularly toward said instrument dial and diverging inwardly away from said one wall of said casing in a direction from the peripheral edge of the sight opening toward the center of the sight opening so that the light rays from said light source are prevented from passing through the sight opening by said louvers but may pass between said louvers toward said dial.

2. Apparatus in accordance with claim 1 wherein the face of each of said louvers adjacent said sight opening is coated with a non-reflecting material and the opposite face of each of said louvers being highly polished and light reflecting so that the light rays may be reflected from said louvers toward said dial.

3. An instrument panel illuminator for an instrument having a casing, a sight opening in one wall of the casing and a dial within the casing adjacent the sight opening, comprising; an integral bracket mounted within said casing outwardly adjacent the peripheral edge of said sight opening, a wall member on said bracket extending transversely of said casing substantially parallel to said one wall of said casing, side wall portions extending forwardly at opposite sides of said bracket wall member toward the said one wall of said casing, means defining a plurality of parallel slots in said side wall portions, a plurality of louvers corresponding in number to said plurality of slots being positioned in said slots in substantially spaced parallel relation, and a light source carried by said bracket positioned adjacent the opposite side of said louvers from said opening so that the light rays from said light source are prevented from passing through said sight opening by said louvers but may pass between said louvers toward said dial.

4. Apparatus in accordance with claim 3 wherein the outermost of said slots relative to said one wall in said casing is of deeper extent than the other of said slots and the louver positioned in said outermost slot is of deeper extent than the others of said louvers to prevent the rays of light from the light source from passing through said sight opening.

5. An instrument panel illuminator for an instrument having a casing, a sight opening in one wall of the casing and a dial within the casing adjacent the sight opening, comprising; an integral bracket mounted within said casing outwardly adjacent the peripheral edge of said sight opening, a wall member on said bracket extending transversely of said casing substantially parallel to said one wall of said casing, side wall portions projecting forwardly at opposite sides of said bracket wall member toward the said one wall of said casing, means defining a plurality of parallel slots in each of said side wall portion, said slots extending angularly toward said instrument dial and diverging inwardly away from said one wall of said casing in a direction from the peripheral edge of the sight opening toward the center of the sight opening, a plurality of louvers corresponding in number to said plurality of said slots being positioned in said slots in substantially spaced parallel relation and extending angularly toward said instrument dial, and a light source carried by said bracket position adjacent the opposite side of said louvers from said sight opening so that the light rays from said light source are prevented from passing through the sight opening by said louvers but may pass between the louvers toward the dial.

6. An instrument panel illuminator for an instrument having a casing, a sight opening in one wall of the casing and a dial within the casing adjacent the sight opening, comprising; an integral bracket mounted within said casing outwardly adjacent the peripheral edge of said sight opening, a wall member on said bracket extending transversely of said casing substantially parallel to said one wall of said casing, side wall portions projecting forwardly at opposite sides of said bracket wall member toward the said one wall of said casing, means defining a plurality of parallel slots in each of said side wall portion, said slots extending angularly toward said instrument dial and diverging inwardly away from said one wall of said casing in a direction from the peripheral edge of the sight opening toward the center of the sight opening, a plurality of louvers corresponding in number to said plurality of said slots being positioned in said slots in substantially spaced parallel relation and extending angularly toward said instrument dial, the face of each of said louvers adjacent said sight opening being coated with a non-reflecting material, the opposite face of each of said louvers being highly polished and light reflecting, a spring clip formed integrally with said bracket extending outwardly therefrom beneath said louvers, and a light source carried by said spring clip, said light source being positioned adjacent the opposite side of said louvers from said sight opening so that the light rays from said light source are prevented from passing through the sight opening by said louver but may pass between said louvers and be reflected from said louvers toward said dial.

References Cited in the file of this patent
UNITED STATES PATENTS

| | | |
|---|---|---|
| 1,413,415 | McPeek | Apr. 18, 1922 |
| 1,555,397 | Brooks et al. | Sept. 29, 1925 |
| 1,670,012 | Talley | May 15, 1928 |
| 2,601,841 | Zindel | July 1, 1952 |
| 2,789,206 | Le Van et al. | Apr. 16, 1957 |